United States Patent [19]

Kamin

[11] 4,160,998
[45] Jul. 10, 1979

[54] TELEVISION-BASED ALARM SYSTEM

[75] Inventor: Gerhard Kamin, Traisa, Fed. Rep. of Germany

[73] Assignee: Robert Bosch GmbH, Fed. Rep. of Germany

[21] Appl. No.: 787,957

[22] Filed: Apr. 15, 1977

[30] Foreign Application Priority Data

Apr. 17, 1976 [DE] Fed. Rep. of Germany ....... 2617111

[51] Int. Cl.² .................................................. H04N 7/18
[52] U.S. Cl. ...................................... 358/105; 358/108
[58] Field of Search ....................... 358/105, 108, 126; 340/146.3 Q, 258 B, 258 D

[56] References Cited
U.S. PATENT DOCUMENTS 3,825,676  7/1974  Ramsden ............................. 358/105

*Primary Examiner*—Robert L. Griffin
*Assistant Examiner*—Edward L. Coles
*Attorney, Agent, or Firm*—Littlepage, Quaintance, Murphy, Richardson and Webner

[57] ABSTRACT

The invention concerns an alarm system for detecting a movement or change in the field of view supervised by a television camera. A discriminator, for example an edge discriminator or an amplitude discriminator, produces a signal upon the occurrence of a predetermined characteristic in the picture content of the video signal from the camera. The number of such signals occurring during each of a plurality of successive television fields is compared with a reference value which is periodically updated. The reference value is derived by counting the total number of signals occurring during a plurality of field periods preceding that for which the comparison is effected and dividing the total by the number of fields thereby generating an arithmetical mean value. Each comparison generates a difference signal which is further evaluated to determine whether a relevant variation in the field of view of the camera has occurred, whereupon an alarm is released.

10 Claims, 1 Drawing Figure

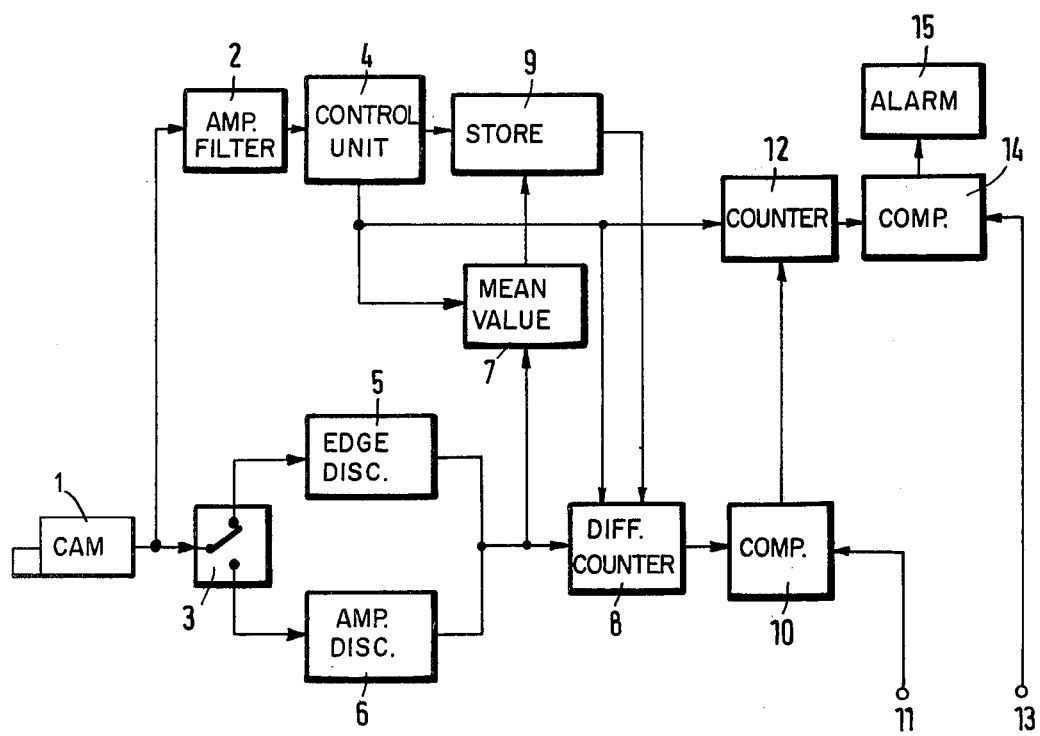

TELEVISION-BASED ALARM SYSTEM

BACKGROUND OF THE INVENTION

1. Field of the Invention

The invention relates to an alarm system for detecting movement or change in the field of view supervised by a television camera.

2. Description of the Prior Art

Television-based alarm systems are known in which a value, dependent upon the picture content of the video signal produced by the television camera, is stored and compared with a value derived at a later time so as to produce a difference, and in which an alarm is emitted upon the difference so produced being in excess of a certain threshold value.

Such a system is disclosed in DT-OS No. 19 13 768. In this system, for the purpose of detecting relevant variations, the total field under supervision is subdivided into a number of individual regions which are separately evaluated. The threshold value of one region can be adjusted independently from that of the other regions. Thus those regions in which irrelevant background movements take place can be isolated from those where the background remains constant. In this way it is possible to detect slight but relevant variations in the total field under supervision without increasing the probability of a spurious alarm being released.

An object of the present invention is to provide an alarm system for detecting movement or change in the field of view supervised by a television camera and which has, or may be designed to have, an increased reliability of response to relevant variations in the total supervised field and at the same time a reduced probability of the release of spurious alarms caused by unavoidable disturbances of a stochastic character. A further object is to provide a system which can be implemented at a reduced capital cost as compared with the prior art.

SUMMARY OF THE INVENTION

Accordingly, the present invention provides an alarm system for detecting a movement or change in the field of view supervised by a television camera, the system comprising a discriminator responsive to the video signal produced by the camera and adapted to produce a signal upon the occurrence of a predetermined characteristic in the picture content of the video signal, means for providing a succession of reference values each derived by adding the number of signals produced by the discriminator during a plurality of equal time intervals of predetermined duration and dividing the sum so formed by the number of time intervals over which the addition is performed, means for comparing the number of signals produced by the discriminator during each of a succession of time intervals, each equal to the said predetermined duration, with the currently provided reference value to produce respective difference values, and means for evaluating the difference values according to a predetermined criterion to produce an alarm when the criterion is satisfied.

The inventive system is based upon the fact that false alarms are—as regards their timing—statistically distributed. Due to the statistical distribution of false alarms, their probability may be described as stochastic and may also be controlled by stochastic means. By suitable choice of reference value on an adequate statistical basis and determinable deviations from this value, and by the assembly of detected events into groups, it is possible to reduce the probability of false alarms and advantageously therewith to lower the detection threshold of a relevant event in the supervised field of view of the television camera.

BRIEF DESCRIPTION OF THE DRAWING

An embodiment of the invention will now be described, by way of example, with reference to the accompanying drawing, whose single FIGURE is a block schematic diagram of a system according to the invention.

DESCRIPTION OF A PREFERRED EMBODIMENT

In the block schematic diagram the video signal produced by a television camera 1, which is aligned upon the object or scene to be supervised, is delivered to an amplitude filter 2 and a changeover switch 3. The television camera 1 preferably operates according to the interlaced scanning technique. In the amplitude filter 2 the synchronous component of the video signal is separated from the latter and, by pulse processing of the synchronous component, a control signal is derived for a control unit 4. The control unit 4 controls the timing of the operating cycle of the alarm system and the control signal derived by the amplitude filter and pulse processor 2 ensures that the cycle timing as determined by the unit 4 is in synchronism with the field periods of the video signal from the camera 1. By means of the changeover switch 3 the video signal may be delivered to an edge discriminator 5 or to an amplitude discriminator 6. The discriminators 5 and 6 convert the analog video signal into a series of counting pulses representing the scene viewed by the camera 1, each pulse being produced upon the occurrence of a particular characteristic in the picture content of the video signal. For example, in the edge discriminator 5, upon a predetermined rate of signal level variation being exceeded in the picture signal, a pulse is delivered independently of the absolute signal level. Because an edge discriminator 5 only registers structural variations, it is particularly suited for evaluating pictures which are characterised by relatively rapid temporary fluctuations of brightness (e.g. open air scenes with rapidly variable lighting caused by moving clouds) but which are irrelevant for the alarm system. The amplitude discriminator 6 on the other hand always delivers a counting pulse if the brightness of the picture exceeds a predetermined threshold value. The particular discriminator used is preselected in dependence upon the particular character of the scene or object in the field of view of the camera 1 and the relevant variations thereof which are expected and which it is desired to detect. Other kinds of discriminator may be used instead of, or in addition to, those specifically mentioned above. Our copending application Ser. No. 787,956 filed Apr. 15, 1977 describes several other discriminators which may be used.

The counting pulses available at the output of the selected discriminator 5 or 6 are delivered both to a mean value former 7 and to a differential counter 8. The mean value former 7 adds together the counting pulses delivered at the discriminator output during a plurality of television fields determined by the control unit 4, and divides the sum so formed by the number of these fields. The mean value former 7 can consist of a dual counter controlled by the control unit 4, by the use of which a division by powers of 2 can be obtained in a simple manner in that, beginning with the lowest position of the counter, one or more succeeding positions of the counter are ignored upon reading out. The mean value produced by the mean value former 7 is fed as a reference value into a store 9, which may have only a low bit capacity, for example 24 bits. Before commencing the evaluation of a particular field to determine whether a relevant movement or change has occurred in the field of view of the camera 1 which it is desired to detect, a differential counter 8 is, by control exercised by the control unit 4, set with the reference value stored in the store 9.

The differential counter 8 (controlled by the control unit 4) subtracts from the set value the number of counting pulses produced by the discriminator 5 or 6 during the field to be evaluated, and produces thereby a difference which is directly available at the end of the respective field in question. It is to be noted that not every field need be evaluated for the purpose of deriving an alarm signal. The interval at which fields are selected for evaluation is determined by the control unit 4, which only activates the differential counter 8 for the required fields. The difference is always represented as a positive quantity because the differential counter 8 is preferably automatically adapted to pass from a reverse to a forward counting mode upon passing through the null position.

By means of a comparator 10, the difference at the output of the differential counter 8 is compared with a preselected first value which is fed in at a terminal 11. Upon this first value being exceeded an "event" signal is generated by the comparator 10, and an "event" counter 12 connected to the output of the comparator 10 registers an event. This event counter 12 will register a maximum of one event for each evaluated field. By control exercised by the control unit 4 the counter 12 is reset to zero after a predetermined number of fields corresponding to a predetermined reference interval. If during the reference interval the number of events registered at the output of the counter 12 exceeds a preselectable second value fed in at a terminal 13, then a further comparator 14 delivers an alarm actuating signal to an alarm generator 15.

The reference value which is read into the store 9, is by means of control exercised by the control unit 4, replaced at predetermined intervals by a fresh reference value originating from the mean value former 7. This ensures that there is a quasi-static response to slow changes in the picture which are irrelevant to the alarm system.

The greater is the number of events at the output of the event counter 12 required for the release of an alarm, the nearer can the first preselected value (at terminal 11), responsible for the formation of an event pulse, be allowed to approach the mean value of the differences, which, theoretically, will be zero at the difference counter 8 in the case of an unchanging scene structure. This has the advantageous result that even small, but significant variations in the picture field, which manifest themselves by a corresponding displacement of the mean value, can be detected without sporadically occurring event pulses, due to dispersion errors of the counter, resulting in a false alarm. After the completion of the predetermined number of field evaluations occurring during the reference interval the event counter 12 is cleared by the control unit 4 so that evaluation takes place not in respect of an absolute number of events but a timed event frequency.

By the employment of a statistically known method for reducing stochastic disturbances and increasing the response reliability to relevant variations in the supervised field of view of the television camera, the above system results in a substantial increase in sensitivity as compared with known systems. Furthermore, because the system preferably involves the processing of binary signals and only a small storage capacity is necessary, the system can be put into practice with the use of integrated circuit components which allows a greater economy and a greater saving of space than the prior art system.

I claim:

1. An alarm system for detecting a movement or change in the field of view supervised by a television camera, the system comprising a discriminator responsive to the video signal produced by the camera and adapted to produce a signal upon the occurrence of a predetermined characteristic in the picture content of the video signal, means for providing a succession of reference values each derived by adding the number of signals produced by the discriminator during a plurality of equal time intervals of predetermined duration and dividing the sum so formed by the number of time intervals over which the addition is performed, difference value means for generating difference values between the number of signals produced by the discriminator during each of a succession of time intervals, each time interval equal to the said predetermined duration, and the currently provided reference value, comparing means for comparing the difference values with a preselected first value to produce an event signal, and evaluating the event signal according to a predetermined criterion to produce an alarm with the criterion is satisfied.

2. An alarm system according to claim 1, in which the television camera operates according to the interlaced scanning technique.

3. An alarm system according to claim 1, in which the evaluating means comprises means to compare each difference value with a preselected first value and for producing an event signal when the first value is exceeded, a further counter for counting the number of event signals, means to compare the count condition of the further counter with a preselected second value, and means for generating an alarm signal when the second value is exceeded.

4. An alarm system according to claim 3, in which the further counter is cleared at predetermined intervals.

5. An alarm system according to claim 1, in which the time intervals of predetermined duration are television field periods.

6. An alarm system according to claim 5, in which the evaluating means comprises means to compare each difference value with a preselected first value and for producing an event signal when the first value is exceeded, a further counter for counting the number of event signals, means to compare the count condition of the further counter with a preselected second value, and means for generating an alarm signal when the second value is exceeded.

7. An alarm system according to claim 6, in which the television camera operates according to the interlaced scanning technique.

8. An alarm system according to claim 6, in which the further counter is cleared at predetermined intervals.

9. An alarm system according to claim 8, in which the difference value means comprises a counter in which the currently provided reference value is set, and in which the signals derived from the discriminator are subtracted from the value set in the counter.

10. An alarm system according to claim 8, in which the television camera operates according to the interlaced scanning technique.

* * * * *